United States Patent
Xu et al.

(10) Patent No.: US 12,526,400 B2
(45) Date of Patent: Jan. 13, 2026

(54) MULTI-TEMPLATE BASED INTRA-FRAME TEMPLATE MATCHING PREDICTION

(71) Applicant: Tencent America LLC, Palo Alto, CA (US)

(72) Inventors: Xiaozhong Xu, State College, PA (US); Xin Zhao, San Jose, CA (US); Roman Chernyak, Palo Alto, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 31 days.

(21) Appl. No.: 18/414,997

(22) Filed: Jan. 17, 2024

(65) Prior Publication Data

US 2024/0244182 A1 Jul. 18, 2024

Related U.S. Application Data

(60) Provisional application No. 63/439,842, filed on Jan. 18, 2023.

(51) Int. Cl.
*H04N 19/105* (2014.01)
*H04N 19/13* (2014.01)
(Continued)

(52) U.S. Cl.
CPC .......... *H04N 19/105* (2014.11); *H04N 19/13* (2014.11); *H04N 19/159* (2014.11); *H04N 19/176* (2014.11)

(58) Field of Classification Search
CPC .... H04N 19/105; H04N 19/13; H04N 19/159; H04N 19/176; H04N 19/11; H04N 19/593
See application file for complete search history.

(56) References Cited

U.S. PATENT DOCUMENTS

| 9,432,692 B2 * | 8/2016 | Lin | .......................... | H04N 19/56 |
| 11,388,421 B1 * | 7/2022 | Wang | ...................... | H04N 19/11 |

(Continued)

OTHER PUBLICATIONS

M. Coban, et al., "Algorithm description of Enhanced Compression Model 5 (ECM5)", ISO/IEC JTC1/SC29/WG5 JVET-Z2025, Apr. 2022, pp. 1-45.

(Continued)

*Primary Examiner* — Dramos Kalapodas
(74) *Attorney, Agent, or Firm* — ARENTFOX SCHIFF LLP

(57) ABSTRACT

A video bitstream including coding information of a current block in a current picture is received, where the coding information indicates that the current block is coded with an intra template matching prediction mode. At least one template for predicting the current block is determined. Each of the at least one template is a respective candidate template of a plurality of template types available in the intra template matching prediction mode. The candidate templates are associated with one of a shape of the current block, a size of the current block, an intra prediction mode of the current block, and distances between the current block and the candidate templates of the plurality of template types. The candidate templates include different combinations of neighboring reconstructed samples. The current block is reconstructed using template match in the intra template matching prediction mode based on the determined at least one template.

20 Claims, 8 Drawing Sheets

(51) Int. Cl.
  *H04N 19/159* (2014.01)
  *H04N 19/176* (2014.01)

(56) References Cited

U.S. PATENT DOCUMENTS

| | | | | |
|---|---|---|---|---|
| 2009/0180538 | A1* | 7/2009 | Visharam | H04N 19/176 |
| | | | | 375/240.15 |
| 2018/0270500 | A1 | 9/2018 | Li et al. | |
| 2022/0224913 | A1* | 7/2022 | Wang | H04N 19/593 |
| 2024/0022763 | A1* | 1/2024 | Chen | H04N 19/159 |
| 2024/0223748 | A1* | 7/2024 | Lin | H04N 19/70 |
| 2024/0244222 | A1* | 7/2024 | Deng | H04N 19/184 |
| 2024/0267533 | A1* | 8/2024 | Zhang | H04N 19/176 |

OTHER PUBLICATIONS

High Efficiency Video Coding, Rec. ITU-T H.265 v4 Dec. 2016, pp. 1-664.

ITU-T and ISO/IEC, "Versatile Video Coding", ITU-T Rec. H.266 and ISO/IEC 23090-3, 2020, pp. 1-516.

T. Nguyen, X. Xu, F. Henry, R.-L. Liao, M. Sarwer; M. Karczewicz; Y.-H. Chao, J. Xu, S. Liu, D. Marpe, G. J. Sullivan, "Overview of the Screen Content Support in VVC: Applications, Coding Tools, and Performance," in IEEE Transactions on Circuits and Systems for Video Technology, pp. 1-17.

J. Li et al., "Intra Block Copy for Screen Content in the Emerging AV1 Video Codec," 2018 Data Compression Conference, 2018, pp. 355-364.

Y. Wang, X. Zhao, X. Xu and S. Liu, "IntraBC with local reference ranges," Alliance for Open Media, Codec Working Group, Document: CWG-B071, pp. 1-6.

International Search Report and Written Opinion received for PCT Patent Application No. PCT/US2024/012017, mailed on May 3, 2024, 8 pages.

* cited by examiner

MULTI-TEMPLATE BASED INTRA-FRAME TEMPLATE MATCHING PREDICTION

INCORPORATION BY REFERENCE

The present application claims the benefit of priority to U.S. Provisional Application No. 63/439,842, "Multi-Template Based Intra-frame Template Matching Prediction" filed on Jan. 18, 2023, which is incorporated by reference herein in its entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Image/video compression can help transmit image/video data across different devices, storage and networks with minimal quality degradation. In some examples, video codec technology can compress video based on spatial and temporal redundancy. In an example, a video codec can use techniques referred to as intra prediction that can compress an image based on spatial redundancy. For example, the intra prediction can use reference data from the current picture under reconstruction for sample prediction. In another example, a video codec can use techniques referred to as inter prediction that can compress an image based on temporal redundancy. For example, the inter prediction can predict samples in a current picture from a previously reconstructed picture with motion compensation. The motion compensation can be indicated by a motion vector (MV).

SUMMARY

Aspects of the disclosure includes methods and apparatuses for video encoding/decoding. In some examples, an apparatus for video decoding includes processing circuitry.

According to an aspect of the disclosure, a method of video decoding performed in a video decoder is provided. In the method, a video bitstream including coding information of a current block in a current picture is received, where the coding information indicates that the current block is coded with an intra template matching prediction mode. At least one template for predicting the current block is determined. Each of the at least one template is a respective candidate template of a plurality of template types available in the intra template matching prediction mode. The candidate templates are associated with one of a shape of the current block, a size of the current block, an intra prediction mode of the current block, and distances between the current block and the candidate templates of the plurality of template types. The candidate templates include different combinations of neighboring reconstructed samples. The current block is reconstructed using template match in the intra template matching prediction mode based on the determined at least one template.

In an example, the plurality of template types includes at least one of a L-shaped template, a top template, or a left template. The L-shaped template includes neighboring samples of the current block above a top side of the current block and at a left side of the current block. The top template includes the neighboring samples of the current block above the top side of the current block. The left template includes the neighboring samples of the current block at the left side of the current block.

In an example, a width of the top template is equal to a width of the current block and a height of the top template is equal to a first positive integer. In an example, a width of the left template is equal to a second positive integer and a height of the left template is equal to a height of the current block.

In example, the intra prediction mode of the current block is determined based on decoder-side intra mode derivation (DIMD) in which the intra prediction mode of the current block is determined based on reconstructed neighboring samples of the current block according to a texture gradient analysis. The at least one template of the current block is determined from the plurality of template types based on the determined intra prediction mode.

In an example, based on a ratio between a width of the current block and a height of the current block being less than a first threshold value, the at least one template of the current block are determined as one of (i) the L-shaped template and the left template and (ii) the left template. In an example, based on the ratio between the width of the current block and the height of the current block being larger than a second threshold value, the at least one template of the current block is determined as one of (i) the L-shaped template and the top template and (ii) the top template.

In an example, the plurality of template types includes a first template at a first distance from the current block and a second template at a second distance from the current block, where the first distance is different from the second distance.

In an example, based on the current block being coded with a first template that is determined from the plurality of template types, a plurality of candidate reference blocks of the current block is determined based on the first template. A difference between the first template of the current block and a template region of each of the plurality of candidate reference blocks corresponding to the first template is determined. The current block is reconstructed based on a weighted combination of a subset of the plurality of candidate reference blocks that corresponds to K smallest differences among the differences between the first template of the current block and the template regions of the plurality of candidate reference blocks.

In an example, based on the current block being coded with two or more templates determined from the plurality of template types, a plurality of candidate reference blocks corresponding to the two or more templates of the current block are determined. A difference between each of the two or more templates of the current block and a template region of each of the plurality of candidate reference blocks corresponding to the respective one of the two or more templates is determined. The current block is reconstructed based on a weighted combination of a subset of the plurality of candidate reference blocks that corresponds to K smallest differences among the differences between the two or more templates of the current block and the template regions of the plurality of candidate reference blocks corresponding to the two or more templates of the current block.

In an example, a context model is determined for entropy coding first signal information that is included in the coding information based on the size of the current block, where the first signal information indicates which one of the plurality of template types is selected as the at least one template of the current block.

In an example, the coding information further includes second signal information indicating that the current block is predicted based on the at least one template that is determined from the plurality of template types.

According to another aspect of the disclosure, an apparatus is provided. The apparatus includes processing circuitry. The processing circuitry can be configured to perform any of the described methods for video decoding/encoding.

Aspects of the disclosure also provide a non-transitory computer-readable medium storing instructions which, when executed by a computer, cause the computer to perform the method for video decoding/encoding.

BRIEF DESCRIPTION OF THE DRAWINGS

Further features, the nature, and various advantages of the disclosed subject matter will be more apparent from the following detailed description and the accompanying drawings in which.

DETAILED DESCRIPTION OF EMBODIMENTS

Figure 1:
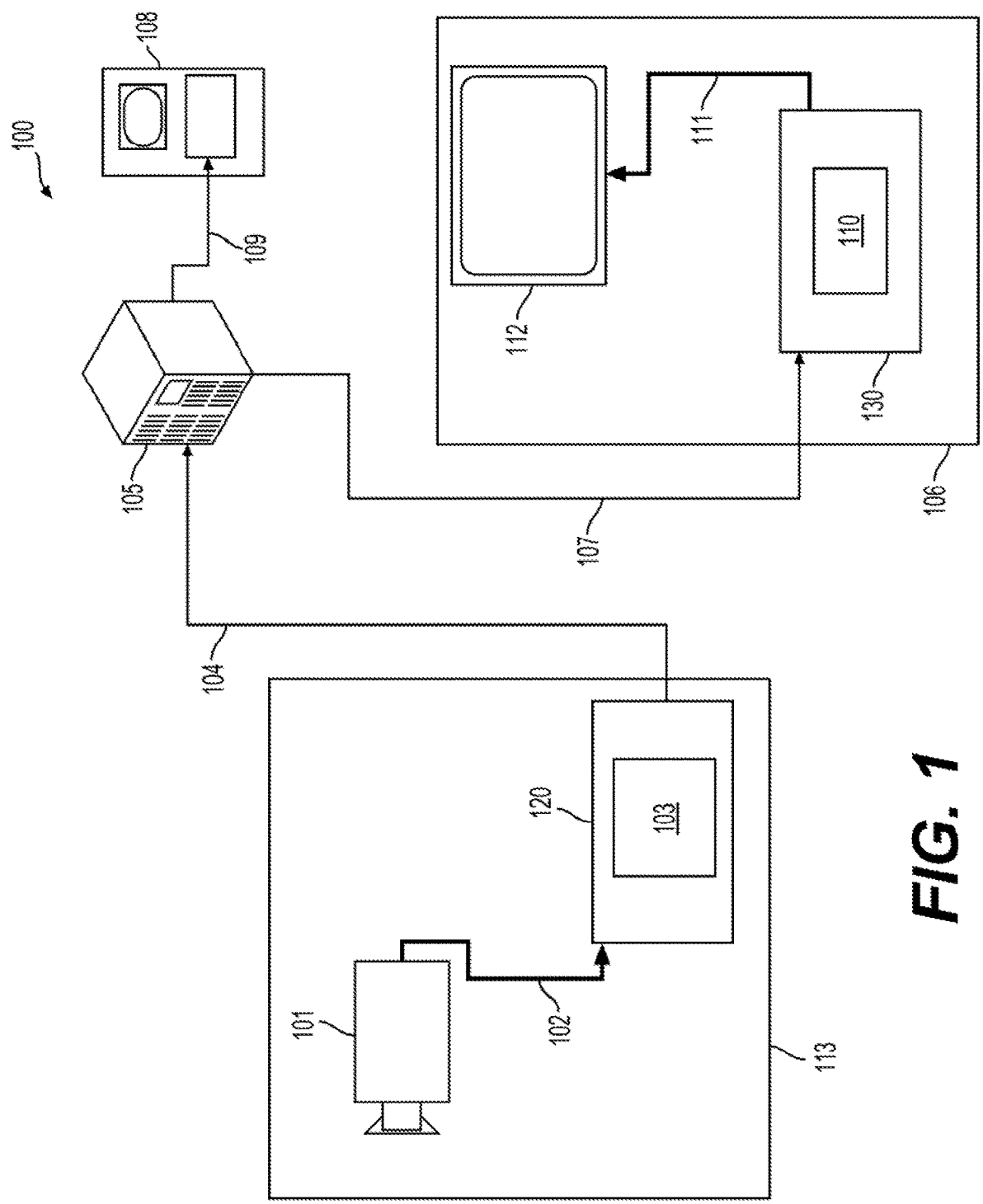
FIG. 1 is a schematic illustration of an exemplary block diagram of a communication system (100).

FIG. 1 shows a block diagram of a video processing system (100) in some examples. The video processing system (100) is an example of an application for the disclosed subject matter, a video encoder and a video decoder in a streaming environment. The disclosed subject matter can be equally applicable to other video enabled applications, including, for example, video conferencing, digital TV, streaming services, storing of compressed video on digital media including CD, DVD, memory stick and the like, and so on.

The video processing system (100) includes a capture subsystem (113), that can include a video source (101), for example a digital camera, creating for example a stream of video pictures (102) that are uncompressed. In an example, the stream of video pictures (102) includes samples that are taken by the digital camera. The stream of video pictures (102), depicted as a bold line to emphasize a high data volume when compared to encoded video data (104) (or coded video bitstreams), can be processed by an electronic device (120) that includes a video encoder (103) coupled to the video source (101). The video encoder (103) can include hardware, software, or a combination thereof to enable or implement aspects of the disclosed subject matter as described in more detail below. The encoded video data (104) (or encoded video bitstream), depicted as a thin line to emphasize the lower data volume when compared to the stream of video pictures (102), can be stored on a streaming server (105) for future use. One or more streaming client subsystems, such as client subsystems (106) and (108) in FIG. 1 can access the streaming server (105) to retrieve copies (107) and (109) of the encoded video data (104). A client subsystem (106) can include a video decoder (110), for example, in an electronic device (130). The video decoder (110) decodes the incoming copy (107) of the encoded video data and creates an outgoing stream of video pictures (111) that can be rendered on a display (112) (e.g., display screen) or other rendering device (not depicted). In some streaming systems, the encoded video data (104), (107), and (109) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (120) and (130) can include other components (not shown). For example, the electronic device (120) can include a video decoder (not shown) and the electronic device (130) can include a video encoder (not shown) as well.

Figure 2:
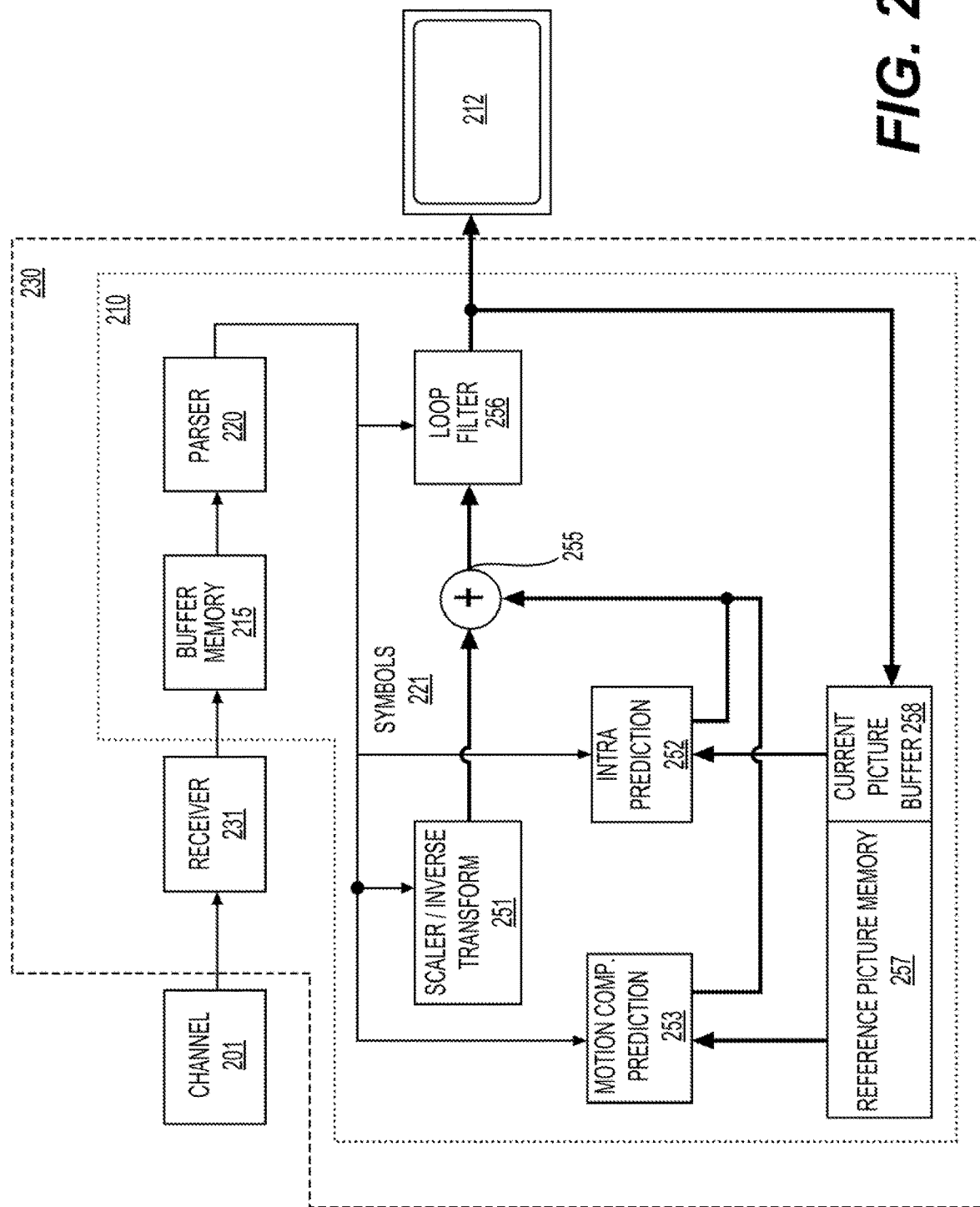
FIG. 2 is a schematic illustration of an exemplary block diagram of a decoder.

FIG. 2 shows an exemplary block diagram of a video decoder (210). The video decoder (210) can be included in an electronic device (230). The electronic device (230) can include a receiver (231) (e.g., receiving circuitry). The video decoder (210) can be used in the place of the video decoder (110) in the FIG. 1 example.

The receiver (231) may receive one or more coded video sequences, included in a bitstream for example, to be decoded by the video decoder (210). In an embodiment, one coded video sequence is received at a time, where the decoding of each coded video sequence is independent from the decoding of other coded video sequences. The coded video sequence may be received from a channel (201), which may be a hardware/software link to a storage device which stores the encoded video data. The receiver (231) may receive the encoded video data with other data, for example, coded audio data and/or ancillary data streams, that may be forwarded to their respective using entities (not depicted). The receiver (231) may separate the coded video sequence from the other data. To combat network jitter, a buffer memory (215) may be coupled in between the receiver (231) and an entropy decoder/parser (220) ("parser (220)" henceforth). In certain applications, the buffer memory (215) is part of the video decoder (210). In others, it can be outside of the video decoder (210) (not depicted). In still others, there can be a buffer memory (not depicted) outside of the video decoder (210), for example to combat network jitter, and in addition another buffer memory (215) inside the video decoder (210), for example to handle playout timing. When the receiver (231) is receiving data from a store/forward device of sufficient bandwidth and controllability, or from an isosynchronous network, the buffer memory (215) may not be needed, or can be small. For use on best effort packet networks such as the Internet, the buffer memory (215) may be required, can be comparatively large and can be advantageously of adaptive size, and may at least partially be implemented in an operating system or similar elements (not depicted) outside of the video decoder (210).

The video decoder (210) may include the parser (220) to reconstruct symbols (221) from the coded video sequence. Categories of those symbols include information used to manage operation of the video decoder (210), and potentially information to control a rendering device such as a render device (212) (e.g., a display screen) that is not an integral part of the electronic device (230) but can be coupled to the electronic device (230), as shown in FIG. 2. The control information for the rendering device(s) may be in the form of Supplemental Enhancement Information (SEI) messages or Video Usability Information (VUI) parameter set fragments (not depicted). The parser (220) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (220) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (220) may also extract from the coded video sequence information such as transform coefficients, quantizer parameter values, motion vectors, and so forth.

The parser (220) may perform an entropy decoding/parsing operation on the video sequence received from the buffer memory (215), so as to create symbols (221).

Reconstruction of the symbols (221) can involve multiple different units depending on the type of the coded video picture or parts thereof (such as: inter and intra picture, inter and intra block), and other factors. Which units are involved, and how, can be controlled by subgroup control information parsed from the coded video sequence by the parser (220). The flow of such subgroup control information between the parser (220) and the multiple units below is not depicted for clarity.

Beyond the functional blocks already mentioned, the video decoder (210) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (251). The scaler/inverse transform unit (251) receives a quantized transform coefficient as well as control information, including which transform to use, block size, quantization factor, quantization scaling matrices, etc. as symbol(s) (221) from the parser (220). The scaler/inverse transform unit (251) can output blocks comprising sample values, that can be input into aggregator (255).

In some cases, the output samples of the scaler/inverse transform unit (251) can pertain to an intra coded block. The intra coded block is a block that is not using predictive information from previously reconstructed pictures, but can use predictive information from previously reconstructed parts of the current picture. Such predictive information can be provided by an intra picture prediction unit (252). In some cases, the intra picture prediction unit (252) generates a block of the same size and shape of the block under reconstruction, using surrounding already reconstructed information fetched from the current picture buffer (258). The current picture buffer (258) buffers, for example, partly reconstructed current picture and/or fully reconstructed current picture. The aggregator (255), in some cases, adds, on a per sample basis, the prediction information the intra prediction unit (252) has generated to the output sample information as provided by the scaler/inverse transform unit (251).

In other cases, the output samples of the scaler/inverse transform unit (251) can pertain to an inter coded, and potentially motion compensated, block. In such a case, a motion compensation prediction unit (253) can access reference picture memory (257) to fetch samples used for prediction. After motion compensating the fetched samples in accordance with the symbols (221) pertaining to the block, these samples can be added by the aggregator (255) to the output of the scaler/inverse transform unit (251) (in this case called the residual samples or residual signal) so as to generate output sample information. The addresses within the reference picture memory (257) from where the motion compensation prediction unit (253) fetches prediction samples can be controlled by motion vectors, available to the motion compensation prediction unit (253) in the form of symbols (221) that can have, for example X, Y, and reference picture components. Motion compensation also can include interpolation of sample values as fetched from the reference picture memory (257) when sub-sample exact motion vectors are in use, motion vector prediction mechanisms, and so forth.

The output samples of the aggregator (255) can be subject to various loop filtering techniques in the loop filter unit (256). Video compression technologies can include in-loop filter technologies that are controlled by parameters included in the coded video sequence (also referred to as coded video bitstream) and made available to the loop filter unit (256) as symbols (221) from the parser (220). Video compression can also be responsive to meta-information obtained during the decoding of previous (in decoding order) parts of the coded picture or coded video sequence, as well as responsive to previously reconstructed and loop-filtered sample values.

The output of the loop filter unit (256) can be a sample stream that can be output to the render device (212) as well as stored in the reference picture memory (257) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (220)), the current picture buffer (258) can become a part of the reference picture memory (257), and a fresh current picture buffer can be reallocated before commencing the reconstruction of the following coded picture.

The video decoder (210) may perform decoding operations according to a predetermined video compression technology or a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (231) may receive additional (redundant) data with the encoded video. The additional data may be included as part of the coded video sequence(s). The additional data may be used by the video decoder (210) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 3:
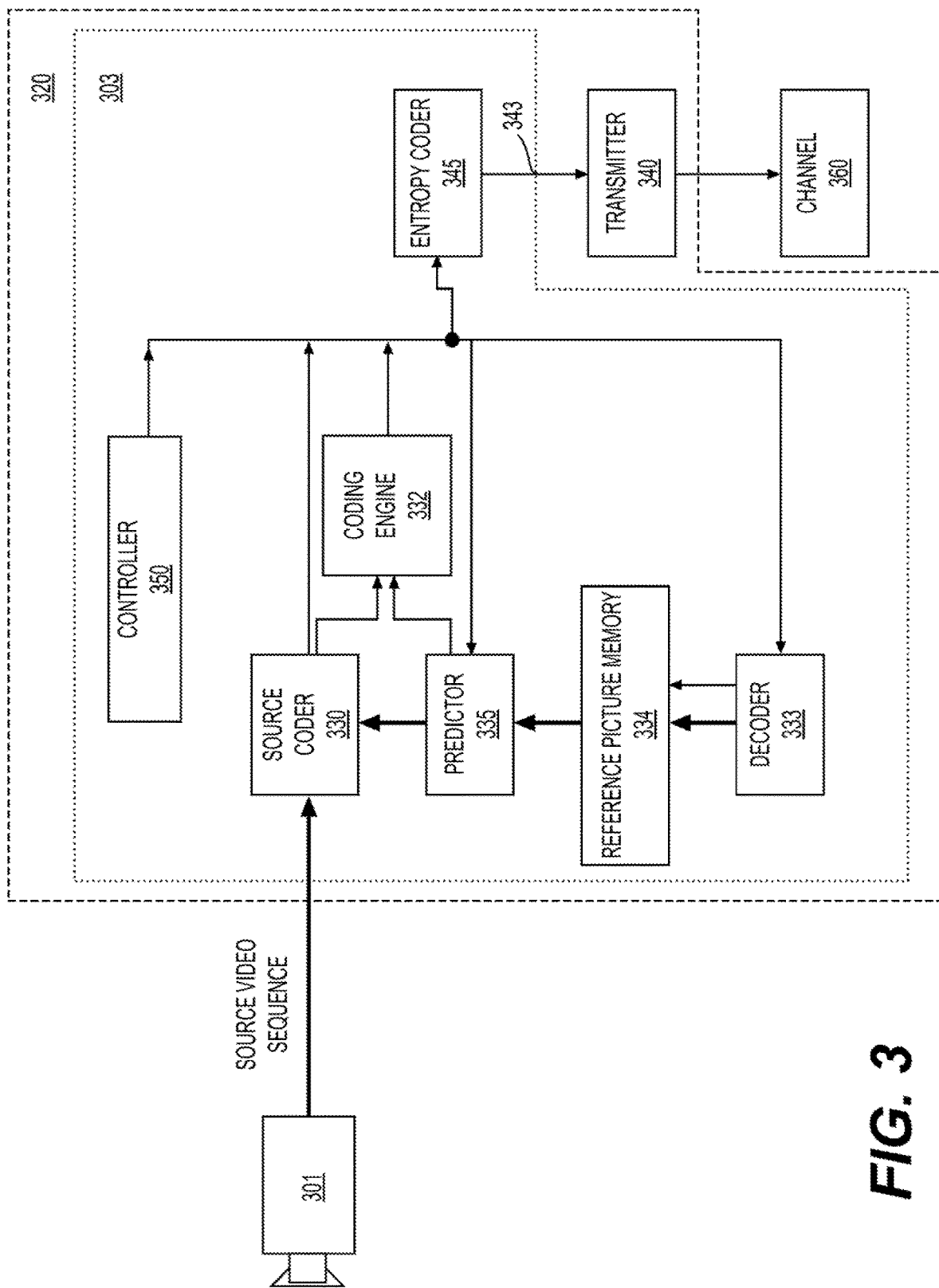
FIG. 3 is a schematic illustration of an exemplary block diagram of an encoder.

FIG. 3 shows an exemplary block diagram of a video encoder (303). The video encoder (303) is included in an electronic device (320). The electronic device (320) includes a transmitter (340) (e.g., transmitting circuitry). The video encoder (303) can be used in the place of the video encoder (103) in the FIG. 1 example.

The video encoder (303) may receive video samples from a video source (301) (that is not part of the electronic device (320) in the FIG. 3 example) that may capture video image(s) to be coded by the video encoder (303). In another example, the video source (301) is a part of the electronic device (320).

The video source (301) may provide the source video sequence to be coded by the video encoder (303) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (301) may be a storage device storing previously prepared video. In a videoconferencing system, the video source (301) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. The description below focuses on samples.

According to an embodiment, the video encoder (303) may code and compress the pictures of the source video sequence into a coded video sequence (343) in real time or under any other time constraints as required. Enforcing appropriate coding speed is one function of a controller (350). In some embodiments, the controller (350) controls other functional units as described below and is functionally coupled to the other functional units. The coupling is not depicted for clarity. Parameters set by the controller (350) can include rate control related parameters (picture skip, quantizer, lambda value of rate-distortion optimization techniques, . . . ), picture size, group of pictures (GOP) layout, maximum motion vector search range, and so forth. The controller (350) can be configured to have other suitable functions that pertain to the video encoder (303) optimized for a certain system design.

In some embodiments, the video encoder (303) is configured to operate in a coding loop. As an oversimplified description, in an example, the coding loop can include a source coder (330) (e.g., responsible for creating symbols, such as a symbol stream, based on an input picture to be coded, and a reference picture(s)), and a (local) decoder (333) embedded in the video encoder (303). The decoder (333) reconstructs the symbols to create the sample data in a similar manner as a (remote) decoder also would create. The reconstructed sample stream (sample data) is input to the reference picture memory (334). As the decoding of a symbol stream leads to bit-exact results independent of decoder location (local or remote), the content in the reference picture memory (334) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (333) can be the same as a "remote" decoder, such as the video decoder (210), which has already been described in detail above in conjunction with FIG. 2. Briefly referring also to FIG. 2, however, as symbols are available and encoding/decoding of symbols to a coded video sequence by an entropy coder (345) and the parser (220) can be lossless, the entropy decoding parts of the video decoder (210), including the buffer memory (215), and parser (220) may not be fully implemented in the local decoder (333).

In an embodiment, a decoder technology except the parsing/entropy decoding that is present in a decoder is present in an identical or a substantially identical functional form, in a corresponding encoder. Accordingly, the disclosed subject matter focuses on decoder operation. The description of encoder technologies can be abbreviated as they are the inverse of the comprehensively described decoder technologies. In certain areas a more detail description is provided below.

During operation, in some examples, the source coder (330) may perform motion compensated predictive coding, which codes an input picture predictively with reference to one or more previously coded picture from the video sequence that were designated as "reference pictures." In this manner, the coding engine (332) codes differences between pixel blocks of an input picture and pixel blocks of reference picture(s) that may be selected as prediction reference(s) to the input picture.

The local video decoder (333) may decode coded video data of pictures that may be designated as reference pictures, based on symbols created by the source coder (330). Operations of the coding engine (332) may advantageously be lossy processes. When the coded video data may be decoded at a video decoder (not shown in FIG. 3), the reconstructed video sequence typically may be a replica of the source video sequence with some errors. The local video decoder (333) replicates decoding processes that may be performed by the video decoder on reference pictures and may cause reconstructed reference pictures to be stored in the reference picture memory (334). In this manner, the video encoder (303) may store copies of reconstructed reference pictures locally that have common content as the reconstructed reference pictures that will be obtained by a far-end video decoder (absent transmission errors).

The predictor (335) may perform prediction searches for the coding engine (332). That is, for a new picture to be coded, the predictor (335) may search the reference picture memory (334) for sample data (as candidate reference pixel blocks) or certain metadata such as reference picture motion vectors, block shapes, and so on, that may serve as an appropriate prediction reference for the new pictures. The predictor (335) may operate on a sample block-by-pixel block basis to find appropriate prediction references. In some cases, as determined by search results obtained by the predictor (335), an input picture may have prediction references drawn from multiple reference pictures stored in the reference picture memory (334).

The controller (350) may manage coding operations of the source coder (330), including, for example, setting of parameters and subgroup parameters used for encoding the video data.

Output of all aforementioned functional units may be subjected to entropy coding in the entropy coder (345). The entropy coder (345) translates the symbols as generated by the various functional units into a coded video sequence, by applying lossless compression to the symbols according to technologies such as Huffman coding, variable length coding, arithmetic coding, and so forth.

The transmitter (340) may buffer the coded video sequence(s) as created by the entropy coder (345) to prepare for transmission via a communication channel (360), which may be a hardware/software link to a storage device which would store the encoded video data. The transmitter (340) may merge coded video data from the video encoder (303) with other data to be transmitted, for example, coded audio data and/or ancillary data streams (sources not shown).

The controller (350) may manage operation of the video encoder (303). During coding, the controller (350) may assign to each coded picture a certain coded picture type, which may affect the coding techniques that may be applied to the respective picture. For example, pictures often may be assigned as one of the following picture types:

An Intra Picture (I picture) may be coded and decoded without using any other picture in the sequence as a source of prediction. Some video codecs allow for different types of intra pictures, including, for example Independent Decoder Refresh ("IDR") Pictures.

A predictive picture (P picture) may be coded and decoded using intra prediction or inter prediction using a motion vector and reference index to predict the sample values of each block.

A bi-directionally predictive picture (B Picture) may be coded and decoded using intra prediction or inter prediction using two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (303) may perform coding operations according to a predetermined video coding technology or standard, such as ITU-T Rec. H.265. In its operation, the video encoder (303) may perform various compression operations, including predictive coding operations that exploit temporal and spatial redundancies in the input video sequence. The coded video data, therefore, may conform to a syntax specified by the video coding technology or standard being used.

In an embodiment, the transmitter (340) may transmit additional data with the encoded video. The source coder (330) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions, are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

It is noted that the video encoders (103) and (303), and the video decoders (110) and (210) can be implemented using any suitable technique. In an embodiment, the video encoders (103) and (303) and the video decoders (110) and (210) can be implemented using one or more integrated circuits. In another embodiment, the video encoders (103) and (303), and the video decoders (110) and (210) can be implemented using one or more processors that execute software instructions.

This disclosure includes aspects related to multi-template based intra-frame template matching prediction. For example, one or more template types can be applied in a template matching process. Introducing multiple types of templates for template matching can be beneficial to improving the accuracy of template matching and coding performance.

In some examples, such as ECM software, intra template matching prediction (IntraTMP) can be a special intra prediction mode for a current block. The intraTMP can copy a best prediction block (e.g., a prediction block with a least difference from the current block) from a reconstructed part of a current frame, where a L-shaped template of the reconstructed part matches a current template of the current block. For a predefined search range, an encoder can search for a most similar template to the current template in a reconstructed part of the current frame and use the corresponding block as a prediction block for the current block. The encoder then can signal the usage of the intraTMP mode, and a same prediction operation can be performed at the decoder side.

Figure 4:
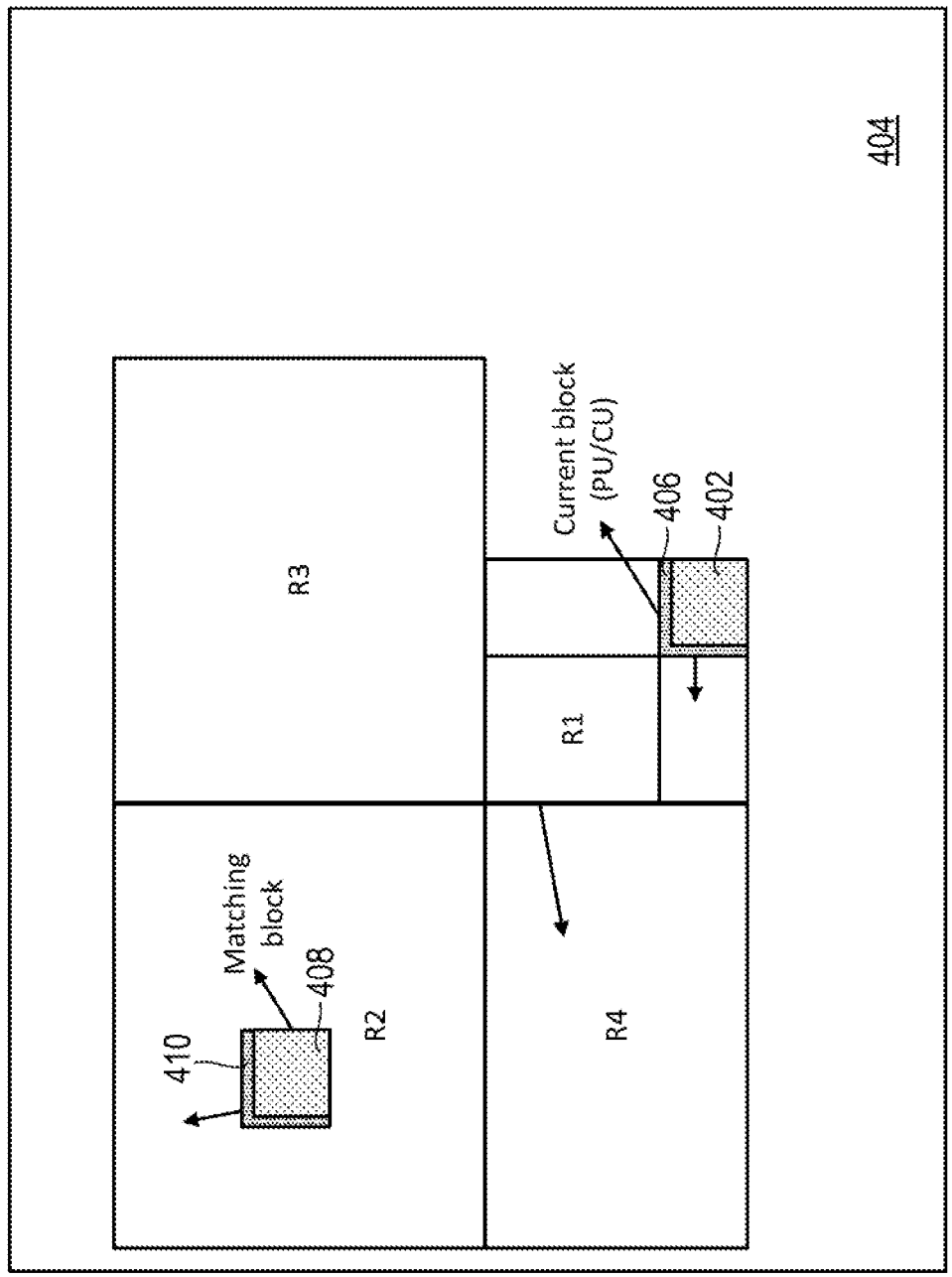
FIG. 4 is a schematic illustration of an intra template matching process.

The prediction signal can be generated by matching the L-shaped causal neighbor of the current block with another block in a predefined search area. An exemplary intraTMP process can be shown in FIG. 4. As shown in FIG. 4, a current block (402) in a current frame (404) can include an L-shaped template (406) that is adjacent to the current block (402). The search regions to determine a reference block for the current block (402) can include (1) R1: a current CTU, (2) R2: a top-left CTU, (3) R3: an above CTU, (4) R4: a left CTU. In the search process, a cost function, such as sum of absolute differences (SAD), can be used. Within each region (e.g., R1, R2, R3, and R4), the decoder can search for a template (e.g., (410)) that has a least SAD with respect to the current one (e.g., template (406)). A block (e.g., (408)) corresponding to the template (e.g., (410)) can be used as a prediction block. The dimensions of all regions (e.g., SearchRange_w, SearchRange_h) can be set as proportional to a block dimension (e.g., BlkW, BlkH) of the current block (402) to have a fixed number of SAD comparisons per pixel. For example, the dimension of the a search region can be defined in equations (1) and (2) as follows:

$$\text{SearchRange\_w} = a * BlkW \qquad \text{Eq. (1)}$$

$$\text{SearchRange\_h} = a * BlkH \qquad \text{Eq. (2)}$$

where a can be a constant that controls a gain/complexity trade-off. In an example, a is equal to 5.

The Intra template matching tool can be enabled for CUs with a size less than or equal to 64 in a width and/or a height. A maximum CU size for intra template matching can be configurable.

The intra template matching prediction mode can be signaled at a CU level through a dedicated flag when decoder-side intra mode derivation (DIMD) may not be used for the current CU.

While IntraTMP mode allows template matching with L-type templates, as noted above, introducing multiple types of templates for template matching can be beneficial to improve the accuracy of template matching, thereby improve coding performance.

In the disclosure, multi-template based intra-frame template matching prediction is provided. According to the multi-template based intra-frame template matching prediction, one or more template types can be selected from a plurality of candidate template types for a current block. The plurality of candidate template types may be fixed or based on a pre-defined condition for example. Each of the one or more selected template types can correspond to a respective template region of the current block. The pre-defined condition can be associated with one of a shape of the current block, a size of the current block, an intra prediction mode of the current block, and distances between the current block and the plurality of candidate template types.

Based on the one or more template types, a plurality of candidate reference blocks corresponding to each of the one or more template types can be determined. A template matching cost (or template matching difference) between each of one or more template regions of the current block and a template region of each of the plurality of candidate reference blocks corresponding to the respective one of the one or more template regions can be determined. The current block can be reconstructed based on at least one or a weighted combination of a subset of the plurality of candidate reference blocks that corresponds to K smallest template matching differences among the template matching differences.

In an aspect, it is proposed that find the best prediction block from the reconstructed part of the current frame, multiple types of templates can be used.

In the disclosure, to find a best prediction block (for example, a prediction block that has a least difference from a current block) from a reconstructed part of a current frame, multiple types of templates can be applied in the IntraTMP mode.

Figure 5:
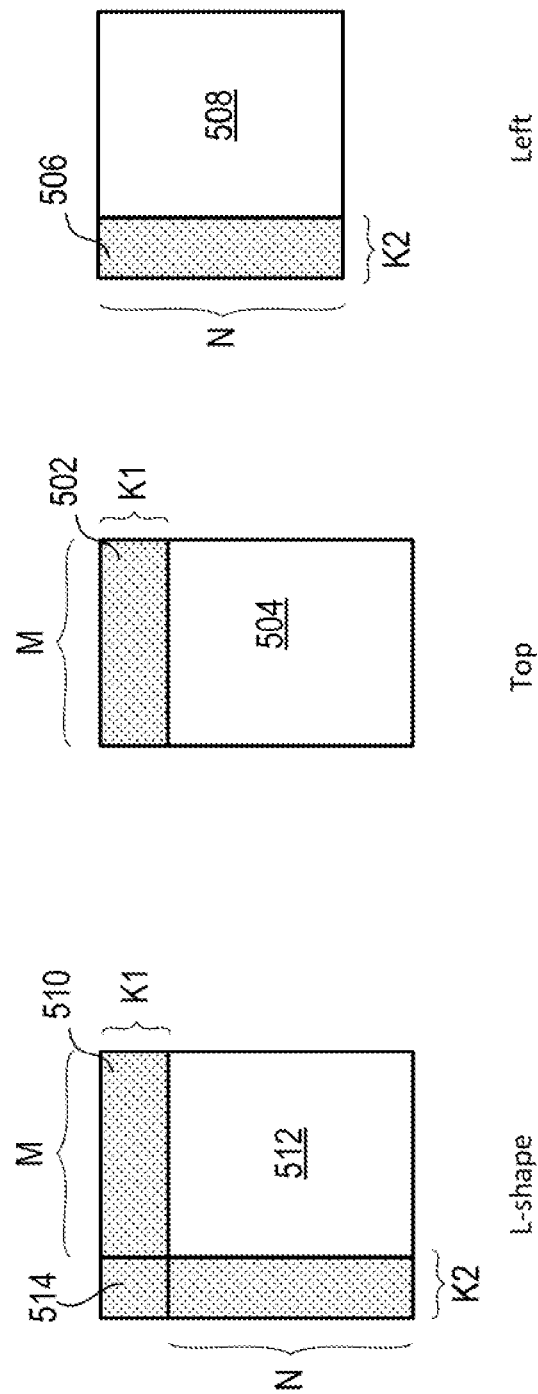
FIG. 5A is a first exemplary template type according to some embodiments of the disclosure.
FIG. 5B is a second exemplary template type according to some embodiments of the disclosure.
FIG. 5C is a third exemplary template type according to some embodiments of the disclosure.

In an aspect, the following template types can be used: L-shaped template, top template and left template. As shown in the figure below, let the template include M×K1 samples above the current block, N×K2 samples to the left and K2×K1 samples in the upper left corner, and the distance between the template and the current block is D In an embodiment, one or more template types can be selected from a plurality of candidate template types. The candidate template types can include a L-shaped template, a top template, a left template, and/or any other suitable template. Exemplary embodiments of the L-shape template, the top template, and the left template are shown in FIGS. 5A, 5B, and 5C, respectively. As shown in FIG. 5B, a top template (502) can include M×K1 samples above a current block (504). As shown in FIG. 5C, a left template (506) can include N×K2 samples at a left side of a current block (508). As shown in FIG. 5A, a L-shaped template (510) can include M×K1 samples above a current block (512), and N×K2 samples at a left side of the current block (512). In an embodiment, the L-shaped template (510) can also include K2×K1 samples at an upper left corner (514) of the current block (512). In an embodiment, a distance between a template, such as the top template (502), the left template (506), or the L-shaped template (510), and the current block (e.g., (508)) is D. D can be an integer or a fractional number.

In an aspect, the selection of L shape template or horizontal/vertical templates can be based on analysis of neighboring reconstructed samples. In one example, using DIMD method to derive a suggested intra prediction mode, and use the intra prediction mode to map into one of the available template shapes.

In an embodiment, selection of a template type (or a template) from a plurality of candidate template types, such as the L-shaped template, the horizontal template (or top template), or the vertical template (or a left template), can be based on analysis of neighboring reconstructed samples. In an example, an intra prediction mode can be derived using a suitable method, such as decoder-side intra mode derivation (DIMD) method. The derived intra prediction mode (e.g., an angular direction) can be mapped into one of the available template shapes. For example, if the derived intra prediction mode indicates a horizontal angular direction, the horizontal template (or top template) can be selected.

In an aspect, templates may be of different sizes, for example:

$$M = b\_w, N = b\_h, K1 = K2 = 1 \quad (1)$$
$$M = b\_w, N = b\_h, K1 = K2 = 2 \quad (2)$$
$$M = b\_w/2, N = b\_h/2, K1 = K2 = 1 \quad (3)$$

In an embodiment, each of the temple types shown in FIGS. 5A, 5B, and 5C can have different sizes. For example, the parameters of M, N, K1, and K2 can be defined as follows:

$$M = b\_w(Q3: \text{block width?yes}), N = b\_h, K1 = K2 = 1$$
$$M = b\_w, N = b\_h, K1 = K2 = 2$$
$$M = b\_w/2, N = b\_h/2, (\text{close to top left}) \; K1 = K2 = 1$$

where b_w stands for a width of the current block, b_h stands for a height of the current block, b_w/2 stands for a half of the width of the current block, and b_h/2 stands for a half of the height of the current block.

In an aspect, the distance D between the template and the current block can be different, for example, a template with D>1 is allowed.

In an example, a distance between a template type (e.g., the L-shaped template) and the current block can be in a range, such as between 1 and 3. In an example, the distance between a template type and the current block can be larger than a threshold value, such as 1. In an example, a first template (e.g., the top template) can have a first distance between the first template and the current block, and a second template (e.g., the left template) can have a second distance between the second template and the current block. The first distance can be different from the second distance. Accordingly, a template type can be selected from the plurality of candidate template types based on a requirement of the distance D between the selected template and the current block.

In an aspect, the list of template matching modes can include single template matching modes and compound template matching modes.

In an aspect, single template matching modes only uses one type of template for template matching.

In an example, the single template matching mode may only use one type of template for template matching. For example, the L-shaped template can be selected. The L-shaped template can correspond to a L-shaped template region of the current block. Further, one or more reference blocks can be determined in a reconstructed area. Each of the one of more reference blocks can include a L-shaped template region corresponding to the L-shaped template. Based on a cost function, such as a SAD cost function, a template matching difference (or template matching cost) between the L-shaped template region of the current block and each of the L-shaped template regions of the one or more reference blocks can be determined. A reference block corresponds to a predetermined template matching difference, such as a minimum template matching difference, can be selected. The current block can further be predicted based on the selected reference block.

In an aspect, compound template matching modes can use the same type template for template matching, and combine the prediction blocks derived from the first K candidates with the lowest SAD cost to obtain the final prediction block.

In an example, the compound template matching mode can use a same type of template to derive a plurality of prediction blocks (or reference blocks) for template matching, and combine (e.g., an average or a weighted combination) the prediction blocks derived from first K candidates with lowest costs, such as SAD costs, to obtain a final prediction block.

For example, based on the current block being coded with a first template type (or a first template), such as the L-shaped template, that is determined from the plurality of candidate template types, a plurality of candidate reference blocks (or candidate prediction blocks) of the current block can be determined based on the first template type. Each of the candidate reference block can have a respective template region with the first template type. Based on a cost function, such as an SAD cost function, a difference between a template region corresponding to the first template type of the current block and a template region of each of the plurality of candidate reference blocks corresponding to the first template type can be determined. The current block can be predicted based on a weighted combination of a subset of the plurality of candidate reference blocks that corresponds to K smallest differences among the differences between the template region of the current block and the template regions of the plurality of candidate reference blocks.

In an aspect, compound template matching modes can use different templates for template matching, weighted and combined the prediction blocks derived from the first K candidate of different templates to obtain the final prediction block.

In an embodiment, the compound template matching modes can use different templates for template matching. The prediction blocks derived from first K candidate of different templates can be combined and weighted to obtain the final prediction block.

For example, two or more template types (e.g., a L-shaped template and a top template) can be determined for a current block, and each of the template types can correspond to a respective template region. A plurality of candidate reference blocks corresponding to each of the two or more template types can be determined in a reconstructed area. For example, a plurality of first candidate reference blocks corresponding to a first template type (e.g., the L-shaped template) can be determined such that each of the plurality of first candidate reference blocks has a respective template region with the first template type. A plurality of second candidate reference blocks corresponding to a second template type (e.g., the top template) can be determined such that each of the plurality of second candidate reference blocks has a respective template region with the second template type. Based on a cost function, such as a SAD cost function, a difference between each of the two or more template regions of the current block and a template region of each of the plurality of candidate reference blocks corresponding to the respective one of the two or more template regions can be determined. For example, a difference between the first template region of the current block corresponding to the first template type and each of the template regions of the plurality of the first candidate reference blocks can be determined. A difference between the second template region of the current block corresponding to the second template type and each of the template regions of the plurality of the second candidate reference blocks can be determined.

The current block can further be predicted based on a weighted combination of a subset of the plurality of candidate reference blocks that corresponds to K smallest differences. For example, the first K candidate reference blocks can be selected that correspond to the first K smallest differences among (i) the differences between the first template region of the current block and the template regions of the plurality of the first candidate reference blocks, and (ii) the differences between the second template region of the current block and the template regions of the plurality of the second candidate reference blocks. The current block can further be predicted based on a weighted combination of the first K candidate reference blocks.

In an aspect, available template matching types are determined according to the size of the current block, w and h denote the width and height of the current block:
  (1) T1 is a predefined threshold, if w/h<T1. The following mode is allowed to use the following types of templates:
    (a) Allow to use L-shape, Left template
    (b) Only Left templates are allowed
  (2) T2 is a predefined threshold, if w/h>T2. The following mode is allowed to use the following types of templates:
    (a) Allow to use L-shape, Top template
    (b) Only Top templates are allowed In an embodiment, available template matching types can be determined according to a size of a current block, where w and h can denote a width and a height of the current block respectively. For example, available template matching types may be based on a ratio (or a shape) of the width and height of the current block.

In an example, when w/h≤T1, where T1 can be a predefined threshold, a first template, such as the L-shaped template, and/or a second template, such as the left template, can be applied. In an example, when w/h≤T1, only a first template, such the left template, may be allowed.

In an example, when w/h>T2, where T2 can be a predefined threshold, a first template, such as the L-shaped template, and/or a second template, such as the top template, can be allowed. In an example, when w/h>T2, only a first template, such as the top template, may be allowed.

In an example, which one of the plurality of candidate template types is selected can be determined based on a shape of the current block. The shape of the current block can include a square shape, a rectangular shape, or the like.

In an aspect, the size of the current block can be used to select the context model for the signaling of selected template mode index.

In an embodiment, signaling of the template mode may be based on the size of the current block. For example, the size of the current block can be used to select a context model for signaling (or entropy coding) a selected template mode index. Thus, a context model can be determined for entropy coding a template mode index based on the size of the current block. The template mode index can indicate which one of the plurality of candidate template types is selected as the template type of the current block.

In an aspect, this mode can be signaled as intra prediction mode or IBC mode.

In an embodiment, the multi-template based intra-frame template matching prediction mode described above in which multiple template types are selected for an intra template matching prediction can be signaled as an intra prediction mode or an intra block copy (IBC) mode.

Figure 6:
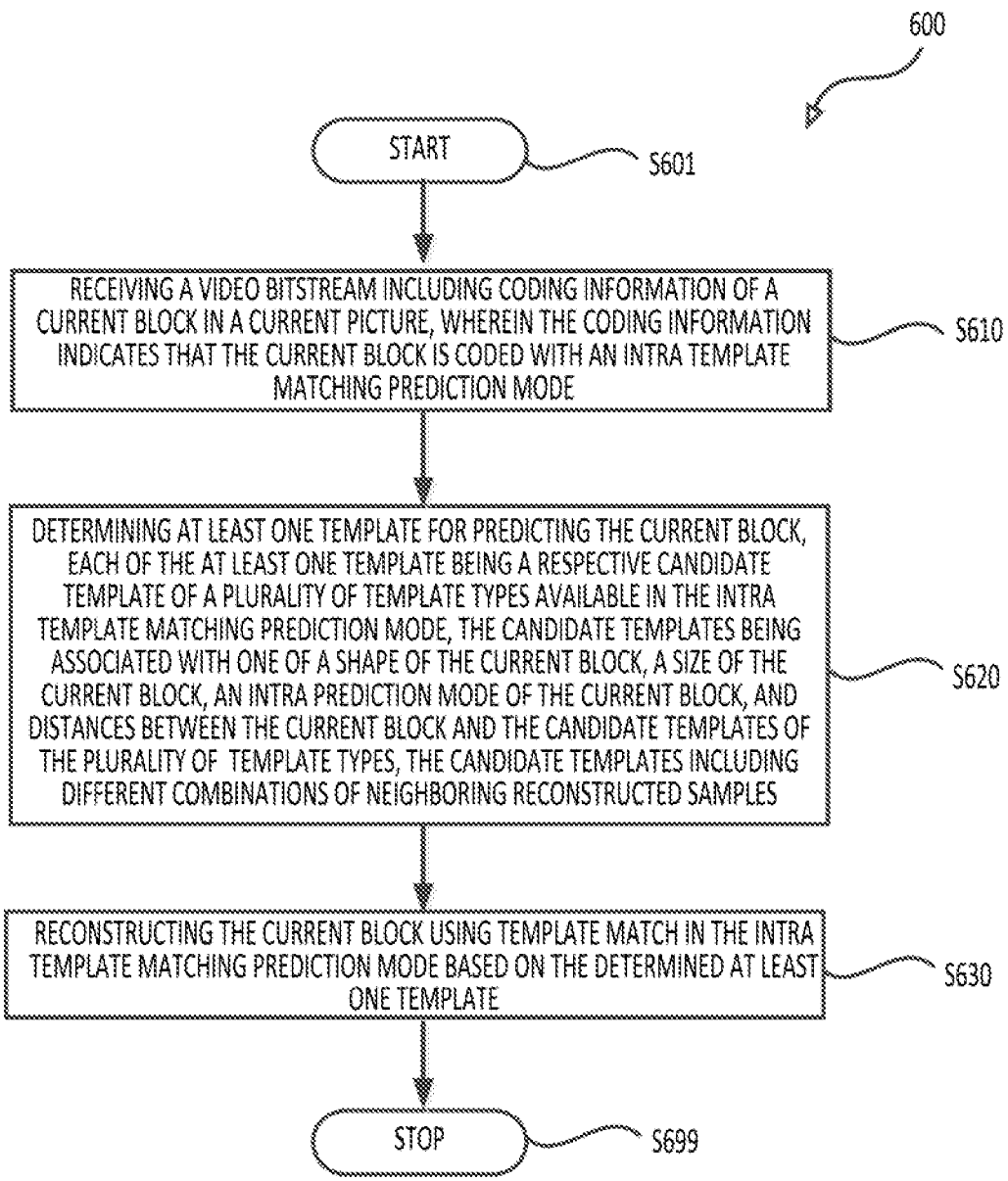
FIG. 6 shows a flow chart outlining a decoding process according to some embodiments of the disclosure.

FIG. 6 shows a flow chart outlining a process (600) according to an embodiment of the disclosure. The process (600) can be used in a video decoder. In various embodiments, the process (600) is executed by processing circuitry, such as the processing circuitry that performs functions of the video decoder (110), the processing circuitry that performs functions of the video decoder (210), and the like. In some embodiments, the process (600) is implemented in software instructions, thus when the processing circuitry executes the software instructions, the processing circuitry performs the process (600). The process starts at (S601) and proceeds to (S610).

At (S610), a video bitstream including coding information of a current block in a current picture is received, where the coding information indicates that the current block is coded with an intra template matching prediction mode.

At (S620), at least one template for predicting the current block is determined. Each of the at least one template is a respective candidate template of a plurality of template types available in the intra template matching prediction mode. The candidate templates are associated with one of a shape of the current block, a size of the current block, an intra prediction mode of the current block, and distances between the current block and the candidate templates of the plurality of template types. The candidate templates include different combinations of neighboring reconstructed samples. In an example, when w/h<T1, where T1 can be a predefined threshold, the L-shaped template and/or the left template can be applied as the one or more template types for the current block. In an example, when w/h<T1, only the left template may be allowed for the current block. In an example, when, if w/h>T2, where T2 can be a predefined threshold, the L-shaped template and/or the top template can be allowed for the current block. In an example, when w/h>T2, only the top template may be allowed for the current block. In an example, a template type can be selected from the plurality of candidate template types based on a requirement of the distance D between the selected template and the current block.

At (S630), the current block is reconstructed using template match in the intra template matching prediction mode based on the determined at least one template. For example, the list of template matching modes can include a single template matching mode and a compound template matching mode.

In an example, the plurality of template types includes at least one of a L-shaped template, a top template, or a left template. The L-shaped template includes neighboring samples of the current block above a top side of the current block and at a left side of the current block. The top template includes the neighboring samples of the current block above the top side of the current block. The left template includes the neighboring samples of the current block at the left side of the current block.

In an example, a width of the top template is equal to a width of the current block and a height of the top template is equal to a first positive integer. In an example, a width of the left template is equal to a second positive integer and a height of the left template is equal to a height of the current block.

In example, the intra prediction mode of the current block is determined based on DIMD in which the intra prediction mode of the current block is determined based on reconstructed neighboring samples of the current block according to a texture gradient analysis. The at least one template of the current block is determined from the plurality of template types based on the determined intra prediction mode.

In an example, based on a ratio between a width of the current block and a height of the current block being less than a first threshold value, the at least one template of the current block are determined as one of (i) the L-shaped template and the left template and (ii) the left template. In an example, based on the ratio between the width of the current block and the height of the current block being larger than a second threshold value, the at least one template of the current block is determined as one of (i) the L-shaped template and the top template and (ii) the top template.

In an example, the plurality of template types includes a first template at a first distance from the current block and a second template at a second distance from the current block, where the first distance is different from the second distance.

In an example, based on the current block being coded with a first template that is determined from the plurality of template types, a plurality of candidate reference blocks of the current block is determined based on the first template. A difference between the first template of the current block and a template region of each of the plurality of candidate reference blocks corresponding to the first template is determined. The current block is reconstructed based on a weighted combination of a subset of the plurality of candidate reference blocks that corresponds to K smallest differences among the differences between the first template of the current block and the template regions of the plurality of candidate reference blocks.

In an example, based on the current block being coded with two or more templates determined from the plurality of template types, a plurality of candidate reference blocks corresponding to the two or more templates of the current block are determined. A difference between each of the two or more templates of the current block and a template region of each of the plurality of candidate reference blocks corresponding to the respective one of the two or more templates is determined. The current block is reconstructed based on a weighted combination of a subset of the plurality of candidate reference blocks that corresponds to K smallest differences among the differences between the two or more templates of the current block and the template regions of the plurality of candidate reference blocks corresponding to the two or more templates of the current block.

In an example, a context model is determined for entropy coding first signal information that is included in the coding information based on the size of the current block, where the first signal information indicates which one of the plurality of template types is selected as the at least one template of the current block.

In an example, the coding information further includes second signal information indicating that the current block is predicted based on the at least one template that is determined from the plurality of template types.

Then, the process proceeds to (S699) and terminates.

The process (600) can be suitably adapted. Step(s) in the process (600) can be modified and/or omitted. Additional step(s) can be added. Any suitable order of implementation can be used.

Figure 7:
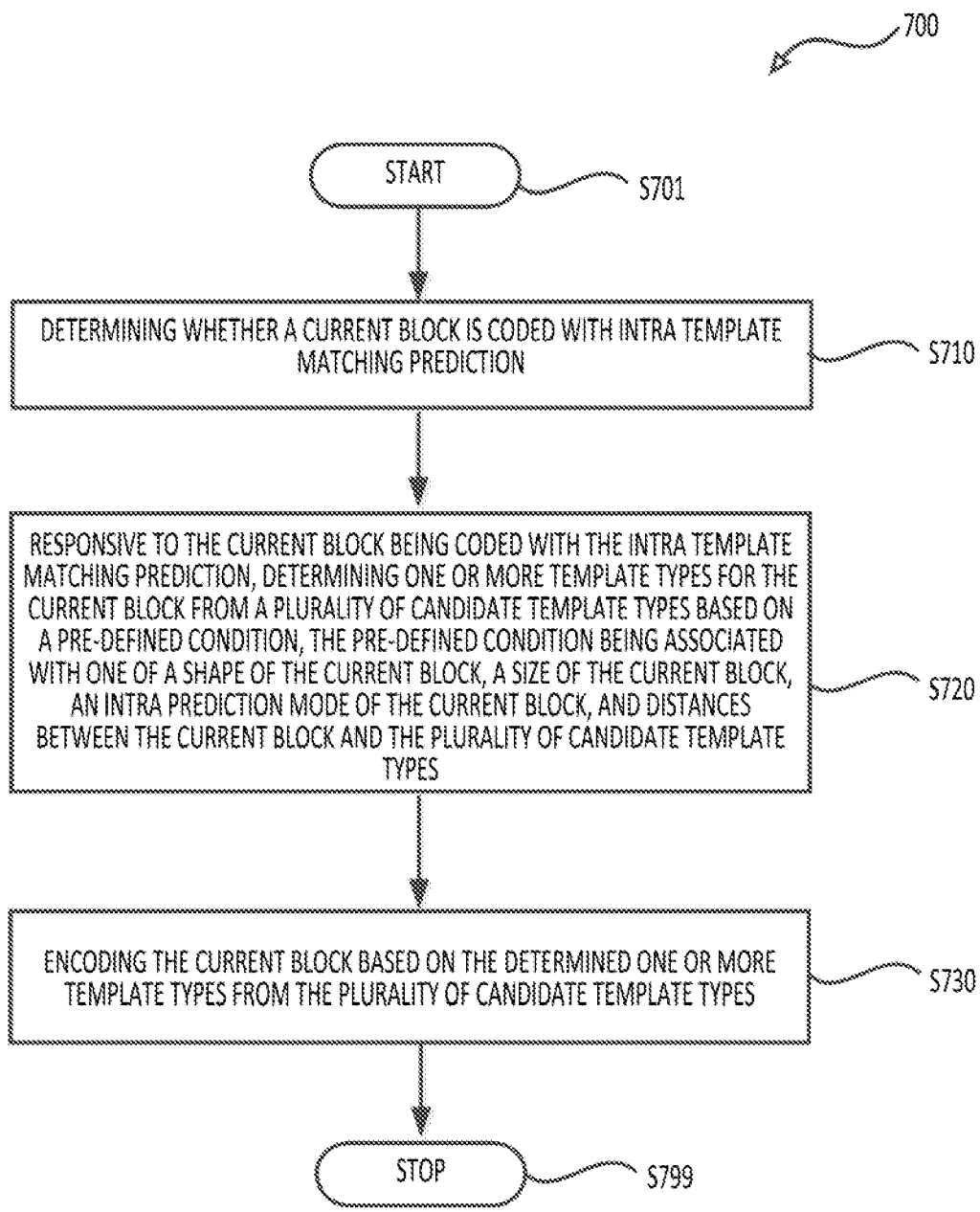
FIG. 7 shows a flow chart outlining an encoding process according to some embodiments of the disclosure.

FIG. 7 shows a flow chart outlining a process (700) according to an embodiment of the disclosure. The process (700) can be used in a video encoder. In various embodiments, the process (700) is executed by processing circuitry, such as the processing circuitry that performs functions of the video encoder (103), the processing circuitry that performs functions of the video encoder (303), and the like. In some embodiments, the process (700) is implemented in software instructions, thus when the processing circuitry executes the software instructions, the processing circuitry performs the process (700). The process starts at (S701) and proceeds to (S710).

At (S710), whether a current block is coded with intra template matching prediction is determined.

At (S720), responsive to the current block being coded with the intra template matching prediction, one or more template types for the current block are determined from a plurality of candidate template types based on a pre-defined condition. The pre-defined condition is associated with one of a shape of the current block, a size of the current block, an intra prediction mode of the current block, and distances between the current block and the plurality of candidate template types.

In an example, when w/h<T1, where T1 can be a pre-defined threshold, the L-shaped template and/or the left template can be applied. In an example, when w/h<T1, only the left template may be allowed. In an example, when, if w/h>T2, where T2 can be a predefined threshold, the L-shaped template and/or the top template can be allowed. In an example, when w/h>T2, only the top template may be allowed. In an example, a template type can be selected from the plurality of candidate template types based on a requirement of the distance D between the selected template and the current block.

At (S730), the current block is encoded based on the determined one or more template types from the plurality of candidate template types. For example, the list of template matching modes can include a single template matching mode and a compound template matching mode.

Then, the process proceeds to (S799) and terminates.

The process (700) can be suitably adapted. Step(s) in the process (700) can be modified and/or omitted. Additional step(s) can be added. Any suitable order of implementation can be used.

The techniques described above, can be implemented as computer software using computer-readable instructions and physically stored in one or more computer-readable media. For example, FIG. 8 shows a computer system (800) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 8:
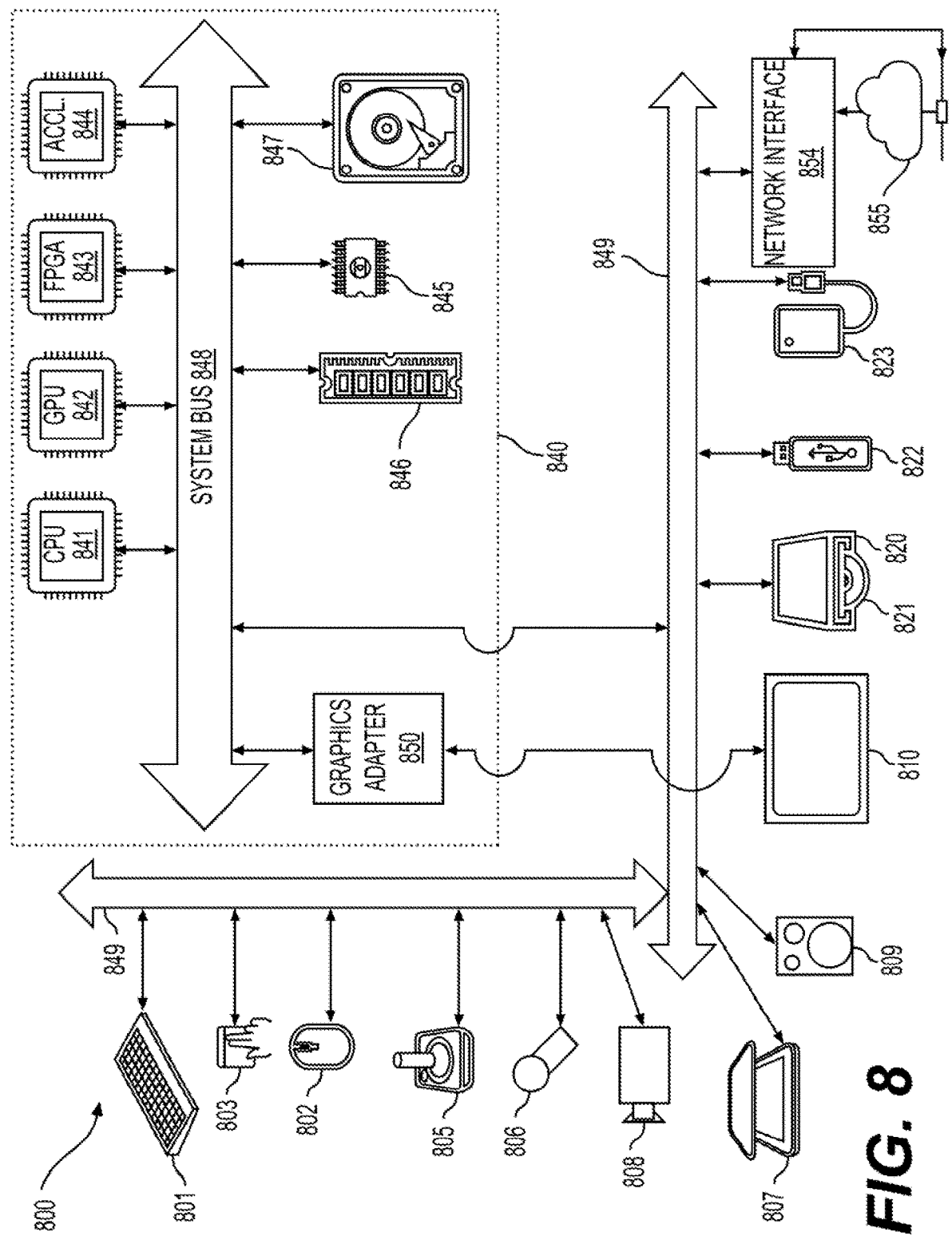
FIG. 8 is a schematic illustration of an exemplary computer system in accordance with an embodiment.

The components shown in FIG. 8 for computer system (800) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (800).

Computer system (800) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (801), mouse (802), trackpad (803), touch screen (810), data-glove (not shown), joystick (805), microphone (806), scanner (807), camera (808).

Computer system (800) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (810), data-glove (not shown), or joystick (805), but there can also be tactile feedback devices that do not serve as input devices), audio output devices (such as: speakers (809), headphones (not depicted)), visual output devices (such as screens (810) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (800) can also include human accessible storage devices and their associated media such as optical media including CD/DVD ROM/RW (820) with CD/DVD or the like media (821), thumb-drive (822), removable hard drive or solid state drive (823), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (800) can also include an interface (854) to one or more communication networks (855). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (849) (such as, for example USB ports of the computer system (800)); others are commonly integrated into the core of the computer system (800) by attachment to a system bus as described below (for example Ethernet interface into a PC computer system or cellular network interface into a smartphone computer system). Using any of these networks, computer system (800) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (840) of the computer system (800).

The core (840) can include one or more Central Processing Units (CPU) (841), Graphics Processing Units (GPU) (842), specialized programmable processing units in the form of Field Programmable Gate Areas (FPGA) (843), hardware accelerators for certain tasks (844), graphics adapters (850), and so forth. These devices, along with Read-only memory (ROM) (845), Random-access memory (846), internal mass storage such as internal non-user accessible hard drives, SSDs, and the like (847), may be connected through a system bus (848). In some computer systems, the system bus (848) can be accessible in the form of one or more physical plugs to enable extensions by additional CPUs, GPU, and the like. The peripheral devices can be attached either directly to the core's system bus (848), or through a peripheral bus (849). In an example, the screen (810) can be connected to the graphics adapter (850). Architectures for a peripheral bus include PCI, USB, and the like.

CPUs (841), GPUs (842), FPGAs (843), and accelerators (844) can execute certain instructions that, in combination, can make up the aforementioned computer code. That computer code can be stored in ROM (845) or RAM (846). Transitional data can also be stored in RAM (846), whereas permanent data can be stored for example, in the internal mass storage (847). Fast storage and retrieve to any of the memory devices can be enabled through the use of cache memory, that can be closely associated with one or more CPU (841), GPU (842), mass storage (847), ROM (845), RAM (846), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (800), and specifically the core (840) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (840) that are of non-transitory nature, such as core-internal mass storage (847) or ROM (845). The software implementing various embodiments of the present disclosure can be stored in such devices and executed by core (840). A computer-readable medium can include one or more memory devices or chips, according to particular needs. The software can cause the core (840) and specifically the processors therein (including CPU, GPU, FPGA, and the like) to execute particular processes or particular parts of particular processes described herein, including defining data structures stored in RAM (846) and modifying such data structures according to the processes defined by the software. In addition or as an alternative, the computer system can provide functionality as a result of logic hardwired or otherwise embodied in a circuit (for example: accelerator (844)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

The use of "at least one of" or "one of" in the disclosure is intended to include any one or a combination of the recited elements. For example, references to at least one of A, B, or C; at least one of A, B, and C; at least one of A, B, and/or C; and at least one of A to C are intended to include only A, only B, only C or any combination thereof. References to one of A or B and one of A and B are intended to include A or B or (A and B). The use of "one of" does not preclude any combination of the recited elements when applicable, such as when the elements are not mutually exclusive.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method of video decoding performed in a video decoder, the method comprising:
   receiving a video bitstream including coding information of a current block in a current picture, wherein the coding information indicates that the current block is coded with an intra template matching prediction mode;
   determining a subset of a plurality of template types that is applicable to determine at least one template of the current block for predicting the current block, each of the at least one template being a respective candidate template in the subset of the plurality of template types available in the intra template matching prediction mode, which one of the plurality of template types is included in the subset of the plurality of template types being determined based on one of a shape of the current block, a size of the current block, an intra prediction mode of the current block, and distances between the current block and the candidate templates of the current block, the candidate templates including different combinations of neighboring reconstructed samples;
   determining the at least one template of the current block based on the subset of the plurality of template types; and
   reconstructing the current block using a template match in the intra template matching prediction mode based on the determined at least one template.

2. The method of claim 1, wherein the plurality of template types includes at least one of a L-shaped template, a top template, or a left template, the L-shaped template including neighboring samples of the current block above a top side of the current block and at a left side of the current block, the top template including the neighboring samples of the current block above the top side of the current block, the left template including the neighboring samples of the current block at the left side of the current block.

3. The method of claim 2, wherein:
   a width of the top template is equal to a width of the current block,
   a height of the top template is equal to a first positive integer,
   a width of the left template is equal to a second positive integer, and
   a height of the left template is equal to a height of the current block.

4. The method of claim 1, wherein the determining the at least one template further comprises:
   determining the intra prediction mode of the current block based on decoder-side intra mode derivation (DIMD) in which the intra prediction mode of the current block is determined based on reconstructed neighboring samples of the current block according to a texture gradient analysis; and
   determining the at least one template of the current block from the plurality of template types based on the determined intra prediction mode.

5. The method of claim 2, wherein the determining the at least one template further comprises:
   when a ratio between a width of the current block and a height of the current block is less than a first threshold value, determining the at least one template of the current block as one of (i) the L-shaped template and the left template and (ii) the left template; and
   when the ratio between the width of the current block and the height of the current block is larger than a second threshold value, determining the at least one template of the current block as one of (i) the L-shaped template and the top template and (ii) the top template.

6. The method of claim 1, wherein the plurality of template types includes a first template at a first distance from the current block and a second template at a second distance from the current block, the first distance being different from the second distance.

7. The method of claim 1, wherein the reconstructing further comprises:
   when the current block is coded with a first template determined from the plurality of template types,
   determining a plurality of candidate reference blocks of the current block based on the first template;
   determining a difference between the first template of the current block and a template region of each of the plurality of candidate reference blocks corresponding to the first template; and
   reconstructing the current block based on a weighted combination of a subset of the plurality of candidate reference blocks that corresponds to K smallest differences among the differences between the first template of the current block and the template regions of the plurality of candidate reference blocks.

8. The method of claim 1, wherein the reconstructing further comprises:
   when the current block is coded with two or more templates determined from the plurality of template types, determining a plurality of candidate reference blocks corresponding to the two or more templates of the current block;

determining a difference between each of the two or more templates of the current block and a template region of each of the plurality of candidate reference blocks corresponding to the respective one of the two or more templates; and reconstructing the current block based on a weighted combination of a subset of the plurality of candidate reference blocks that corresponds to K smallest differences among the differences between the two or more templates of the current block and the template regions of the plurality of candidate reference blocks corresponding to the two or more templates of the current block.

9. The method of claim 1, further comprising:

determining a context model for entropy coding first signal information that is included in the coding information based on the size of the current block, the first signal information indicating which one of the plurality of template types is selected as the at least one template of the current block.

10. The method of claim 1, wherein the coding information further includes second signal information indicating that the current block is predicted based on the at least one template that is determined from the plurality of template types.

11. A method of video encoding, the method comprising:

determining a subset of a plurality of template types that is applicable to determine at least one template of a current block for predicting the current block in intra template matching prediction mode, each of the at least one template being a respective candidate template in the subset of the plurality of template types available in the intra template matching prediction mode, which one of the plurality of template types is included in the subset of the plurality of template types being determined based on one of a shape of the current block, a size of the current block, an intra prediction mode of the current block, and distances between the current block and the candidate templates of the current block, the candidate templates including different combinations of neighboring reconstructed samples;

determining the at least one template of the current block based on the subset of the plurality of template types; and encoding the current block into a bitstream using a template match in the intra template matching prediction mode based on the determined at least one template.

12. The method of claim 11, wherein the plurality of template types includes at least one of a L-shaped template, a top template, or a left template, the L-shaped template including neighboring samples of the current block above a top side of the current block and at a left side of the current block, the top template including the neighboring samples of the current block above the top side of the current block, the left template including the neighboring samples of the current block at the left side of the current block.

13. The method of claim 12, wherein:

a width of the top template is equal to a width of the current block, a height of the top template is equal to a first positive integer, a width of the left template is equal to a second positive integer, and a height of the left template is equal to a height of the current block.

14. The method of claim 1, wherein the determining the at least one template further comprises:

determining the intra prediction mode of the current block based on decoder-side intra mode derivation (DIMD) in which the intra prediction mode of the current block is determined based on reconstructed neighboring samples of the current block according to a texture gradient analysis; and determining the at least one template of the current block from the plurality of template types based on the determined intra prediction mode.

15. The method of claim 12, wherein the determining further comprises:

when a ratio between a width of the current block and a height of the current block is less than a first threshold value, determining the at least one template of the current block as one of (i) the L-shaped template and the left template and (ii) the left template; and when the ratio between the width of the current block and the height of the current block is larger than a second threshold value, determining the at least one template of the current block as one of (i) the L-shaped template and the top template and (ii) the top template.

16. The method of claim 11, wherein the plurality of template types includes a first template at a first distance from the current block and a second template at a second distance from the current block, the first distance being different from the second distance.

17. The method of claim 11, wherein the encoding further comprises:

when the current block is coded with a first template determined from the plurality of template types, determining a plurality of candidate reference blocks of the current block based on the first template;

determining a difference between the first template of the current block and a template region of each of the plurality of candidate reference blocks corresponding to the first template; and encoding the current block based on a weighted combination of a subset of the plurality of candidate reference blocks that corresponds to K smallest differences among the differences between the first template of the current block and the template regions of the plurality of candidate reference blocks.

18. The method of claim 11, wherein the encoding further comprises:

when the current block is coded with two or more templates determined from the plurality of template types, determining a plurality of candidate reference blocks corresponding to the two or more templates of the current block;

determining a difference between each of the two or more templates of the current block and a template region of each of the plurality of candidate reference blocks corresponding to the respective one of the two or more templates; and encoding the current block based on a weighted combination of a subset of the plurality of candidate reference blocks that corresponds to K smallest differences among the differences between the two or more templates of the current block and the template regions of the plurality of candidate reference blocks corresponding to the two or more templates of the current block.

19. The method of claim 11, further comprising:

determining a context model for entropy coding first signal information into the bitstream based on the size of the current block, the first signal information indicating which one of the plurality of template types is selected as the at least one template of the current block.

20. A non-transitory computer readable medium storing a video media bitstream encoded by an encoding method, the encoding method comprising:

determining a subset of a plurality of template types that is applicable to determine at least one template of a current block for predicting the current block in intra template matching prediction mode, each of the at least one template being a respective candidate template in the subset of the plurality of template types available in the intra template matching prediction mode, which one of the plurality of template types is included in the subset of the plurality of template types being determined based on one of a shape of the current block, a size of the current block, an intra prediction mode of the current block, and distances between the current block and the candidate templates of the current block, the candidate templates including different combinations of neighboring reconstructed samples;

determining the at least one template of the current block based on the subset of the plurality of template types; and encoding the current block into the video media bitstream using a template match in the intra template matching prediction mode based on the determined at least one template.

* * * * *